United States Patent
Hashimoto et al.

(10) Patent No.: US 10,853,233 B2
(45) Date of Patent: Dec. 1, 2020

(54) RECONSTRUCTION OF ADDRESS MAPPING IN A HOST OF A STORAGE SYSTEM

(71) Applicant: TOSHIBA MEMORY CORPORATION, Tokyo (JP)

(72) Inventors: Daisuke Hashimoto, Susono (JP); Shigehiro Asano, Yokosuka Kanagawa (JP); Katsuhiko Ueki, Katsushika Tokyo (JP); Mark Hayashida, San Ramon, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 556 days.

(21) Appl. No.: 15/296,841

(22) Filed: Oct. 18, 2016

(65) Prior Publication Data

US 2018/0107592 A1   Apr. 19, 2018

(51) Int. Cl.
*G06F 3/06* (2006.01)
*G06F 12/06* (2006.01)
*G06F 12/02* (2006.01)

(52) U.S. Cl.
CPC .......... *G06F 12/0246* (2013.01); *G06F 3/061* (2013.01); *G06F 3/064* (2013.01); *G06F 3/0619* (2013.01); *G06F 3/0659* (2013.01); *G06F 3/0679* (2013.01); *G06F 2212/7201* (2013.01)

(58) Field of Classification Search
CPC .................. G06F 11/1446; G06F 11/1469
See application file for complete search history.

(56) References Cited

U.S. PATENT DOCUMENTS

| | | | |
|---|---|---|---|
| 8,189,391 B2 | 5/2012 | Itagaki et al. | |
| 8,631,304 B2* | 1/2014 | Lasser | G06F 11/1012 714/776 |
| 9,235,502 B2* | 1/2016 | Khmelnitsky | G06F 12/0246 |
| 2006/0224818 A1* | 10/2006 | Stewart | G06F 11/1435 711/103 |
| 2008/0270730 A1* | 10/2008 | Lasser | G06F 12/0246 711/170 |
| 2010/0131697 A1* | 5/2010 | Alrod | G06F 11/1068 711/103 |
| 2010/0207195 A1 | 8/2010 | Fukuzumi et al. | |
| 2010/0254191 A1 | 10/2010 | Son et al. | |
| 2011/0258514 A1* | 10/2011 | Lasser | H03M 13/2906 714/763 |
| 2011/0296123 A1* | 12/2011 | Adler | G06F 12/0246 711/156 |
| 2014/0164693 A1* | 6/2014 | Hasegawa | G06F 3/0686 711/111 |
| 2014/0229656 A1* | 8/2014 | Goss | G06F 3/061 711/103 |

(Continued)

*Primary Examiner* — Christopher D Birkhimer
(74) *Attorney, Agent, or Firm* — Kim & Stewart LLP

(57) ABSTRACT

A storage device includes a nonvolatile memory including a plurality of physical blocks, a communication interface connectable to a host, and a controller. The controller is configured to generate metadata of host data, which include user data and metadata of the user data, and write, in a physical block of the nonvolatile memory, the metadata of the host data, the metadata of the user data, and the user data continuously in this order, when the host data are received through the communication interface in association with a write command.

20 Claims, 13 Drawing Sheets

(56) References Cited

U.S. PATENT DOCUMENTS

2014/0337560 A1\* 11/2014 Chun ................. G06F 12/0246
　　　　　　　　　　　　　　　　　711/103
2016/0139813 A1\* 5/2016 Chen ................. G06F 12/0246
　　　　　　　　　　　　　　　　　711/103

\* cited by examiner

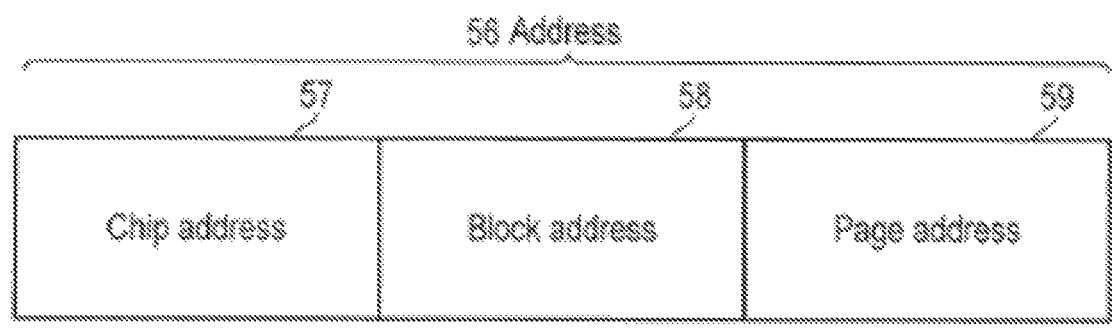

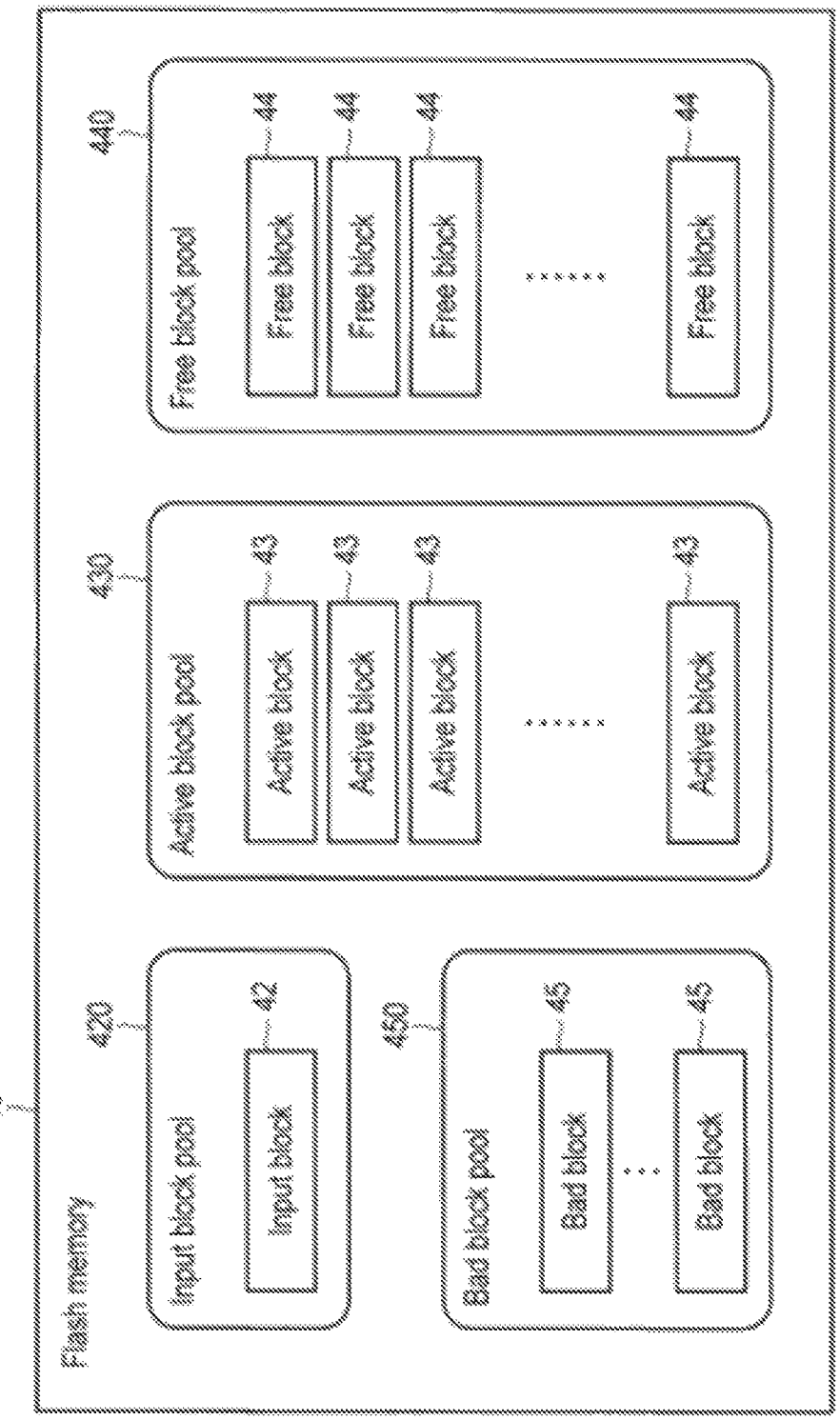

RECONSTRUCTION OF ADDRESS MAPPING IN A HOST OF A STORAGE SYSTEM

FIELD

The present disclosure generally relates to a storage system including a host and a storage device, in particular, a storage system that manages location of write data based on physical addresses.

BACKGROUND

A storage system typically includes a host and one or more storage devices each of which may include one or more nonvolatile memory chips, such as NAND flash memory chips. In order to determine a physical location at which the data are stored using an identifier for the data or a logical address of the data, mapping data is stored in each of the storage devices or in the host, and the physical location of the data is determined by referring to the mapping data. Specifically, in a storage system of one type, such mapping data are stored in each of the storage devices, and the location of data communicated between the host and the storage devices is designated by a logical address. In a storage system of another type, the mapping data are stored in the host, and the location of data communicated between the host and the storage devices is the physical location of the data, e.g., designated by physical address of nonvolatile memory chips.

In the latter type of storage system, i.e., a system in which the host stores the mapping data, mapping data (more particularly a same mapping table as the one stored in the host) is usually not stored in the storage devices. The reason for this is that the host takes initiative to determine locations of the storage device to be accessed, and the storage device is expected to operate in more passive ways. Further, the host typically stores at least latest mapping data in a volatile memory so that the host can quickly access the mapping data (although non-updated mapping data may be stored in a nonvolatile memory of the host). However, in such a system, when the mapping data stored in the volatile memory of the host become unavailable or lost for some reason, e.g., sudden power shutdown of the host, the host may partially lose access to data stored in the storage device. It would be desirable to store data in the storage device in a way that ensures more reliable access thereto.

DESCRIPTION OF THE DRAWINGS

FIG. 7 illustrates an example of an address structure of a physical address according to the embodiment.

FIG. 8 illustrates an example of a look up table (LUT) indicating address correspondence according to the embodiment.

FIG. 9 illustrates an overview of mapping of physical blocks based on block pools in the embodiment.

DETAILED DESCRIPTION

According to an embodiment, a storage device includes a nonvolatile memory including a plurality of physical blocks, a communication interface connectable to a host, and a controller. The controller is configured to generate metadata of host data, which include user data and metadata of the user data, and write, in a physical block of the nonvolatile memory, the metadata of the host data, the metadata of the user data, and the user data continuously in this order, when the host data are received through the communication interface in association with a write command.

According to another embodiment, a storage system includes a storage device including a nonvolatile memory including a plurality of physical blocks, a communication interface, and a controller, and a host connected to the communication interface of the storage device, and including a processor and a volatile memory in which mapping between a logical address or identifier of user data and a physical location of the nonvolatile memory is stored. The controller is configured to generate metadata of host data, which include user data and metadata of the user data, and write, in a physical block of the nonvolatile memory, the metadata of the host data, the metadata of the user data, and the user data continuously in this order, when the host data are received through the communication interface from the host in association with a write command.

According to still another embodiment, a computing device connectable to a nonvolatile storage device includes a volatile memory and a processor. The processor is configured to transmit host data, which include user data and metadata of user data, in association with a write command issued thereby, store, in the volatile memory, mapping between a logical address or identifier of the user data and a physical location of the nonvolatile storage device in which the user data are written, issue a scan command to the nonvolatile storage device when the mapping is lost from the volatile memory or when the mapping in the volatile memory is not accessible, and reconstruct the mapping based on metadata of the host data and the metadata of the user data returned from the nonvolatile storage device in response to the scan command.

Details of the present disclosure are described below with reference to the drawings.

[Storage System]

Figure 1:
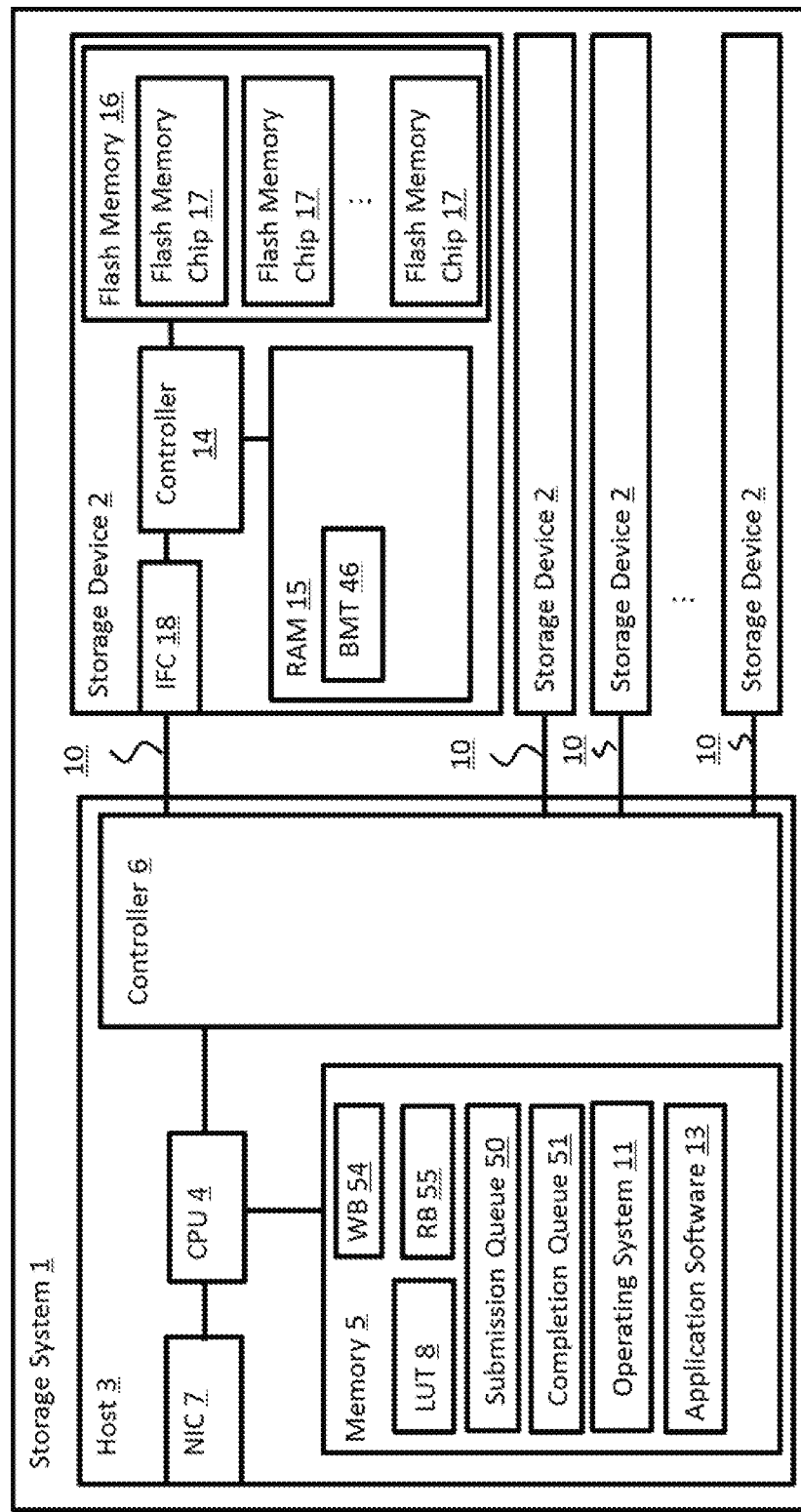
FIG. 1 illustrates a configuration of a storage system, which includes a host and at least a storage device, according to an embodiment.
Figure 2:
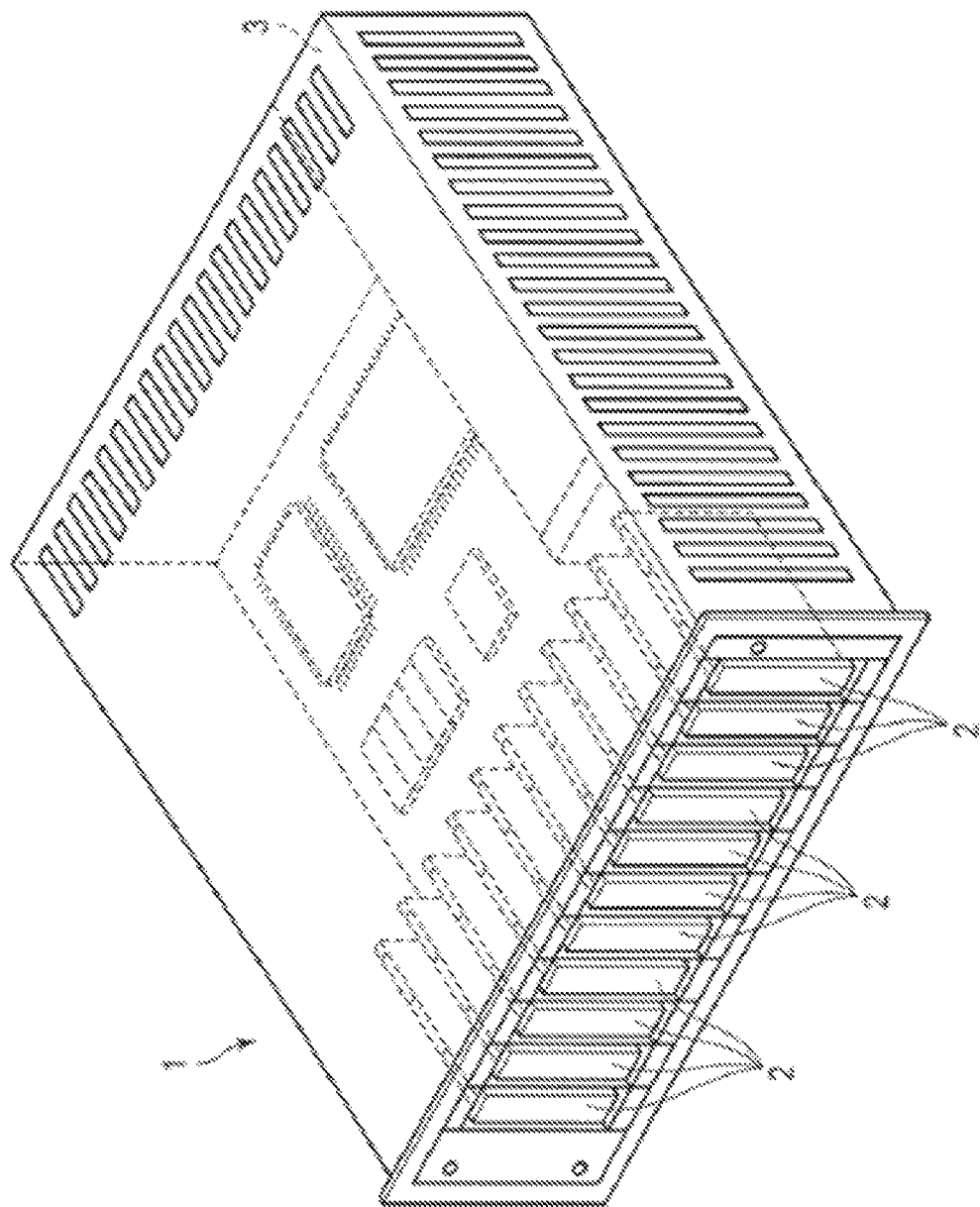
FIG. 2 illustrates a physical configuration of the storage system according to the embodiment.

FIG. 1 illustrates a configuration of a storage system 1 according to an embodiment. The storage system 1 includes a host 3, one or more storage devices 2, and an interface 10 configured to connect the host 3 and each of the storage devices 2. In the present embodiment, the storage system 1 is a 2 U storage appliance shown in FIG. 2. That is, the host 3 and the one or more storage devices 2 are enclosed in a housing having a size of the 2 U storage appliance. Each of the storage devices 2 is a nonvolatile storage device such as a 2.5 inch form factor, 3.5 inch form factor, M.2 form factor, or an Add-In Card (AIC) form factor. Further, in the present embodiment, the interface 10 employs PCI Express (Peripheral Component Interconnect Express, PCIe) interface. Alternatively, the interface 10 can employ any other technically feasible protocol, such as SAS (Serial Attached SCSI) protocol, USB (Universal Serial Bus), SATA (Serial Advanced Technology Attachment), Thunderbolt®, Ethernet®, Fibre channel, and the like.

The storage device 2 includes a controller 14, a random access memory (RAM) 15, a non-volatile semiconductor memory, such as a NAND flash memory 16 (hereinafter flash memory 16), and an interface controller (IFC) 18. The IFC 18 is configured to perform transmission and reception of signals to and from the host 3 via the interface 10. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14. The flash memory 16 includes one or more flash memory chips 17 and stores user data 60 (See FIG. 11) designated by the host 3 in one or more of the flash memory chips 17. The controller 14 and the flash memory 16 are connected via a flash memory interface 21 (See FIG. 4), such as Toggle and ONFI.

The host 3 includes a CPU (central processing unit) 4, a memory 5, a controller 6, and a network interface controller (NIC) 7. The CPU 4 is a central processing unit in the host 3, and performs various calculations and control operations of the host 3. The CPU 4 and the controller 6 are connected through an interface using a protocol such as PCI Express. The CPU 4 performs control of the storage device 2 via the controller 6. The controller 6 is a PCIe Switch and a PCIe expander in the present embodiment, but, a SAS expander, a RAID controller, a JBOD controller, a JBOF controller, and the like may be used as the controller 6.

The CPU 4 also performs control of the memory 5. The memory 5 in the present embodiment is a volatile memory, such as a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to an external network via a network interface. The network interface employs a protocol, for example, an Ethernet, InfiniBand, Fibre Channel, PCI Express Fabric, WiFi, and the like.

The memory 5 temporarily stores a program and data and functions as a working memory of the CPU 4. The memory 5 includes memory regions for storing the OS 11, application software 13, a look-up table (LUT) 8, a submission queue 50, and a completion queue 51, and also includes a write buffer (WB) 54 and a read buffer (RB) 55. As is generally known, the OS 11 represents system software for managing the host 3, and may be a commodity OS such as Linux®, Windows®, or a virtualization software available from VMware, Inc. The OS 11 is executed to manage an input to and an output from the host 3, the storage devices 2, and the memory 5. That is, the OS 11 enables software to use components in the storage system 1, including the storage devices 2. Also, the OS 11 is used to control a manner of data writing to the storage devices 2 and data reading from the storage devices 2.

The write buffer 54 temporarily stores data to be written into the storage devices 2, i.e., user data. The read buffer (RB) 55 temporarily stores data read from the storage devices 2, i.e., read data. The LUT 8 is used to manage mapping between File IDs (Object IDs or logical addresses) of data and physical addresses of a flash memory 16 and the write buffer memory 54 in which the data are stored for writes or to be stored for reads. The submission queue 50 contains, for example, commands and requests with respect to the storage devices 2. The completion queue 51 contains information indicating completion of the commands and requests and information related to the completion, which were sent to the host 3 upon completion of the commands and requests by the storage devices 2.

The host 3 sends, to a storage device 2 via the corresponding interface 10, a number of commands for accessing the storage device 2. The commands include a read command 90, a write command 91, a scan command 92, an invalidate command, a copy command, and the like, as described below in detail.

Figure 3:
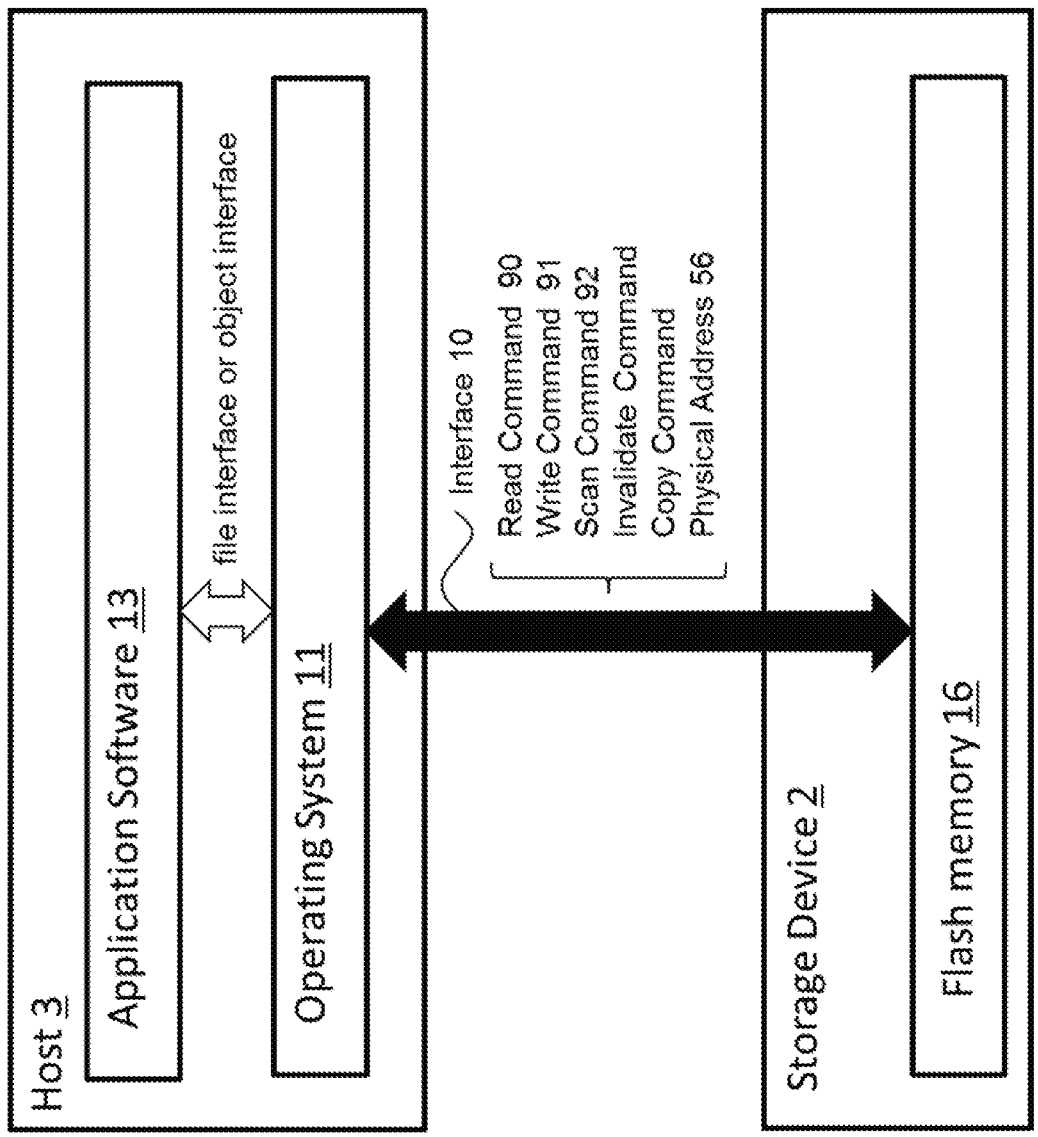
FIG. 3 illustrates a software layer structure of the host and communication architecture between the host and a storage device according to the embodiment.

In addition, one or more units of the application software 13 are loaded, respectively, in the memory 5. FIG. 3 illustrates a software layer structure of the host 3 and communication architecture between the host 3 and the storage device 2 according to the present embodiment. Usually, the application software 13 loaded in the memory 5 does not directly communicate with the storage device 2 and instead communicates with the storage device 2 through the OS 11 loaded in the memory 5 via a file interface and an object interface.

The OS 11 operates to transmit commands including the read command 90, the write command 91, the scan command 92, the invalidate command, and the copy command, and a physical address 56, to the storage device 2 via the interface 10. The physical address 56 is used to designate a physical location of the flash memory 16 to be accessed for data reading or data writing. In accordance with these commands and the physical address, if any, the flash memory 16 (more particularly the flash memory chip 17) carries out data-access processing.

The application software 13 includes, for example, client software, database software (e.g., Cassandra DB, Mongo DB, HBASE, and etc.), Distributed Storage System (Ceph etc.), Virtual Machine (VM), guest OS, and Analytics Software (e.g., Hadoop, R, and etc.).

[Flash Memory Chip]

Figure 4:
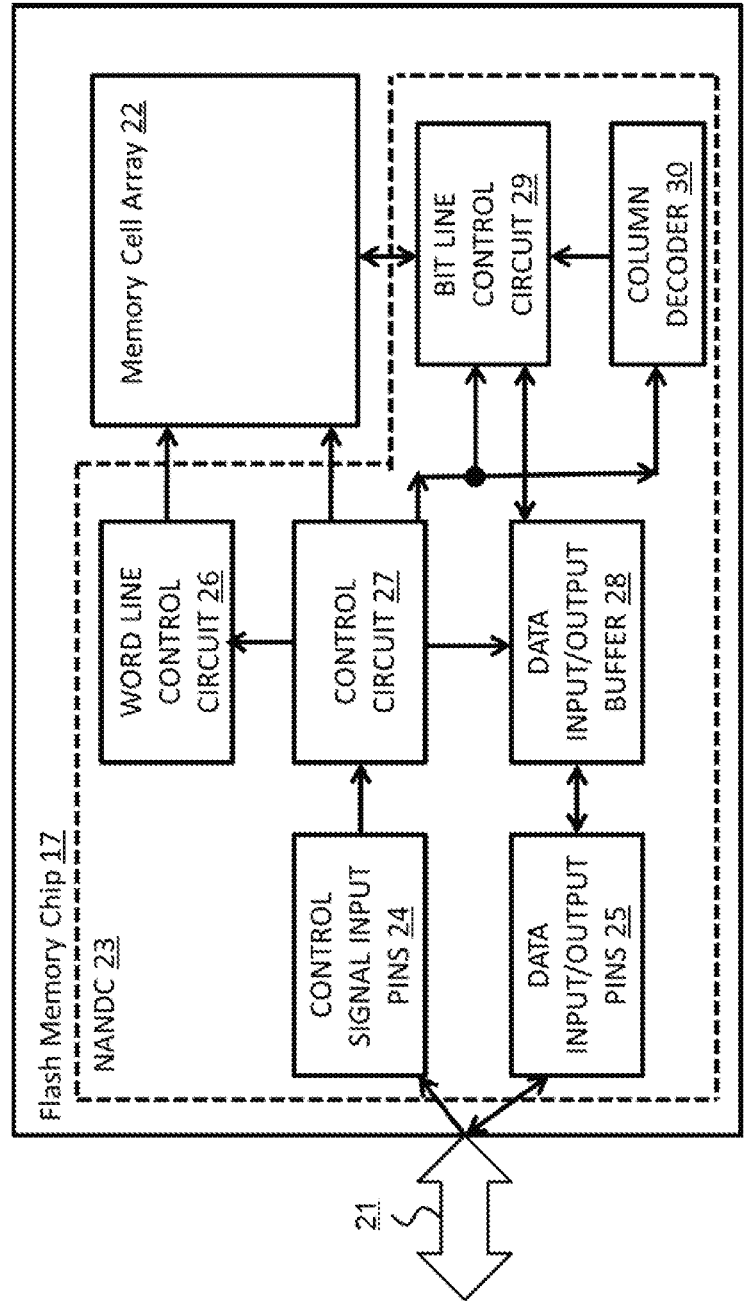
FIG. 4 illustrates a configuration of a flash memory chip in a storage device.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each of which stores data, as described below in detail. The NANDC 23 is a controller configured to control access to the memory cell array 22. Specifically, the NANDC 23 includes control signal input pins 24, data input/output pins 25, a word line control circuit 26, a control circuit 27, a data input/output buffer 28, a bit line control circuit 29, and a column decoder 30. The control circuit 27 is connected to the control signal input pins 24, the word line control circuit 26, the data input/output buffer 28, the bit line control circuit 29, and the column decoder 30, and controls the entire operations of the circuit components of the NANDC 23. Also, the memory cell array 22 is connected to the word line control circuit 26 and the control circuit 27. Further, the control signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data are transferred to the controller 14 of the storage device 2 from the data input/output pins 25 through the flash interface 21. When data are written to the flash memory chip 17, data to be written (write data) are input to the data input/output buffer 28 through the data input/output pins 25. Then, the write data are transferred to the column decoder 30 through the control circuit 27, and input to the bit line control circuit 29 by the column decoder 30. The write data are written to memory cells of the memory cell array 22 with a timing controlled by the word line control circuit 26 and the bit line control circuit 29. When control signals are input to the flash memory chip 17 from the controller 14 of the storage device 2 through the flash interface 21, the control signals are input through the control signal input pins 24 into the control circuit 27. Then, the control circuit 27 generates control signals, according to the control signals from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
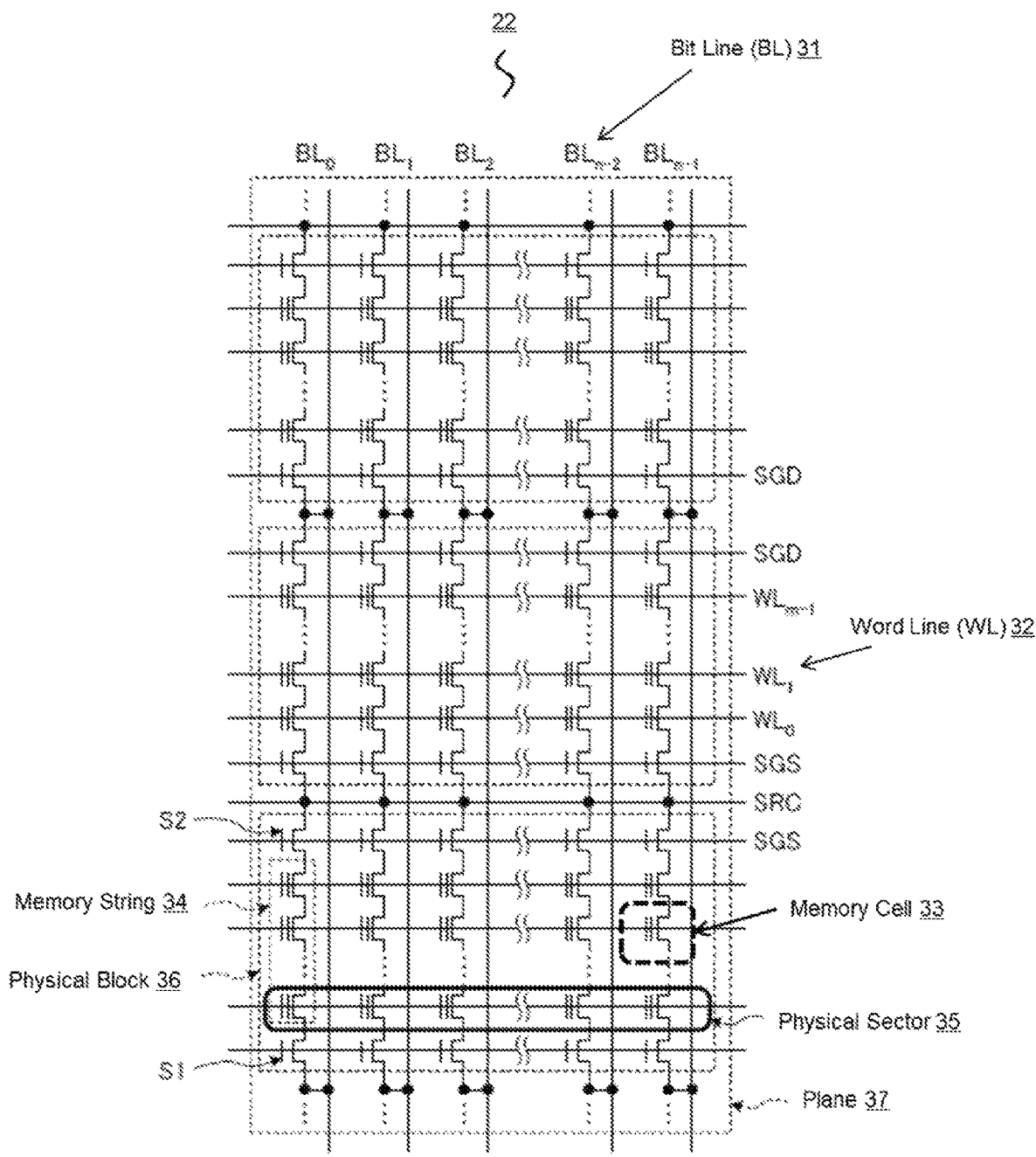
FIG. 5 illustrates a detailed circuit structure of a memory cell array in the flash memory chip.

FIG. 5 illustrates a detailed circuit structure of the memory cell array 22. The memory cell array 22 includes one or more planes 37 (only one of which is depicted in FIG. 5). Each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each memory string (MS) 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm−1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation (also referred to as a program operation), a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. A physical address comprises a physical block address 58 and a physical page address 59 (See FIG. 7). A physical page address is assigned to each of the physical pages, and a physical block address is assigned to each of the physical blocks 36.

Figure 6:
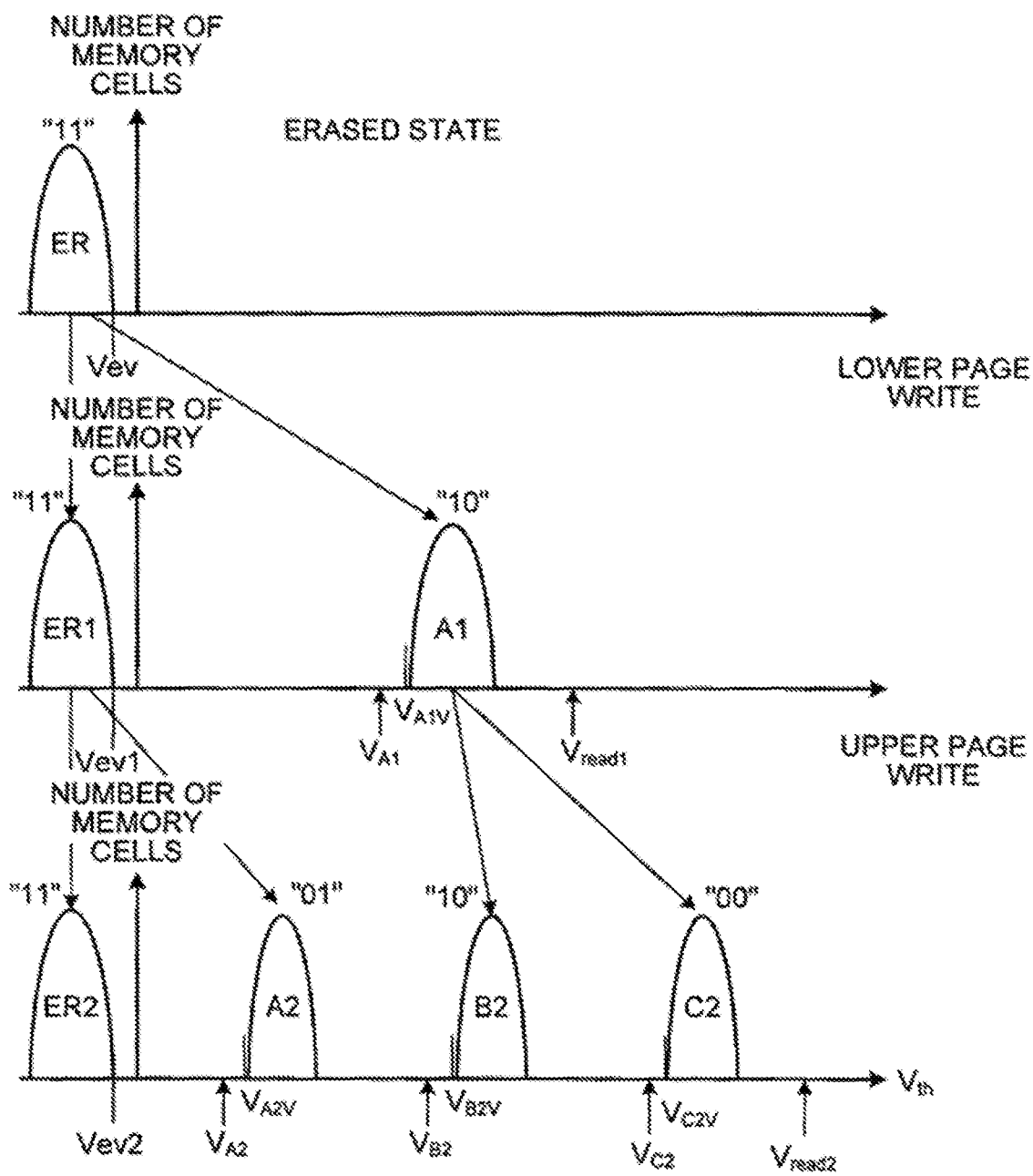
FIG. 6 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, i.e., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data by varying the threshold voltage thereof.

For example, each of the memory cells 33 may employ a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S.

Pat. No. 8,189,391, United States Patent Application Publication No. 2010/0207195, and United States Patent Application Publication No. 2010/0254191, the entire contents of both applications are incorporated by reference herein.

[Address Structure]

FIG. 7 illustrates an example of an address structure of the physical address 56 according to the present embodiment. The physical address 56 is transmitted via the interface 10 between the host 3 and the storage device 2 as a form of the address structure shown in FIG. 7, when the OS 11 operates according to the procedure of the physical access. The address structure of the physical address 56 includes a chip address 57, a block address 58, and a page address 59. In the present embodiment, the chip address 57 is located at the MSB (most significant bit) side of the address structure, and the page address 59 is located at the LSB (least significant bit) side of the address structure as shown in FIG. 7. However, the locations of the chip address 57, the block address 58, and the page address 59 in the physical address 56 can be determined arbitrarily.

[Address Mapping]

FIG. 8 illustrates an overview of the mapping of physical addresses in the present embodiment. As described above, the address mapping is managed using the LUT 8 stored in the memory 5 of the host 3. In the LUT 8, each entry indicates correspondence between a File ID (Object ID or logical address) of data, which is used by the host 3 to identify the data and a physical address of the flash memory 16 in which the data are stored. For example, when the host 3 reads data of a certain File ID from the flash memory 16, the CPU 4 of the host 3 obtains a physical address corresponding to the File ID by referring to the LUT 8 and includes the obtained physical address in the read command 90 2 in order to read the data.

Data of the LUT 8 may be lost when power supply to the LUT 8 is shut off without performing any data backup procedure for the data of the LUT 8, because the LUT 8 is stored in the memory 5, which is a volatile memory. Without the LUT 8, the host 3 cannot locate the data stored in the flash memory 16 and thus cannot access the data. According to the present embodiment, write data written in the flash memory during a write operation contain metadata of user data, so that the LUT 8 can be reconstructed using the metadata during a scan operation as described below.

[Block Mapping]

FIG. 9 illustrates an overview of the mapping of physical blocks based on block pools in the present embodiment. As described above, the block mapping is managed using the BMT 46 stored in the RAM 15. The block pools include an input block pool 420, an active block pool 430, a free block pool 440, and a bad block pool 450. The mappings of physical blocks are managed by the controller 14 of the storage device 2, and when a physical block is remapped into a different block pool, the controller 14 updates the mappings in the BMT 46. The controller 14 maps each of the physical blocks of the flash memory 16 to one of the block pools, in the BMT 46.

The input block pool 420 includes at least one input block 42. The input block 42 is a block in which data are written. The input block 42 may store no data, or include both a written region and an unwritten region in which data can be written.

The active block pool 430 may include one or more active blocks 43. The active block 43 is a physical block that no longer has a writable region (i.e., becomes full of data). Also, at least some of the written data in the active block 43 are valid data.

The free block pool 440 includes one or more free blocks 44. The free block 44 includes physical blocks that have not stored any data previously and physical blocks that store no valid data. That is, all data stored in the free block 44, if any, have been invalidated.

The bad block pool 450 includes one or more bad blocks 45. The bad block 45 is a block that cannot be used for data writing, for example, because of defects.

Figure 10:
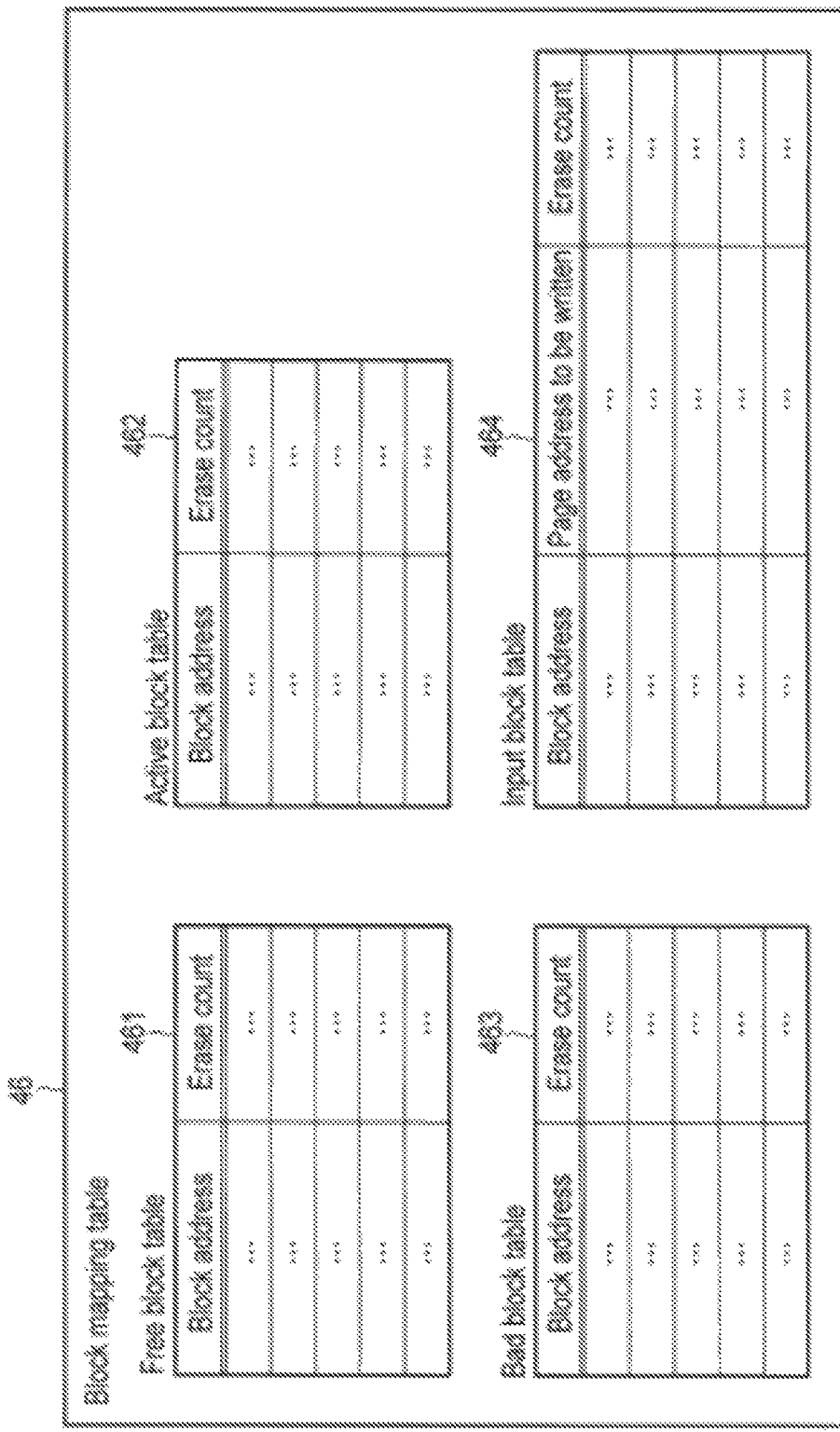
FIG. 10 illustrates an example of a block mapping table (BMT) according to the embodiment.

FIG. 10 illustrates an example of the block mapping table (BMT) 46 employed in the storage device 2 according to the present embodiment. The BMT 46 includes a free block table 461, an active block table 462, a bad block table 463, and an input block table 464. In each of the tables 461-464 of the BMT 46, each entry indicates correspondence between a block address and an erase count, which indicates a number of times data in the block address have been erased. Other configurations of different types of block pools may be also managed in the BMT 46.

The input block table 464 also indicates a physical page address (PPA) in which next write data are to be written. When the controller 14 remaps a free block 44 in the free block pool 440 as an input block 42, the controller 14 removes a block address of the free block 44 from the free block table 461, and adds a new entry including the block address and PPA=0 to the input block table 464.

Because bad blocks 45 of the flash memory 16 are managed by the controller 14 using the bad block table 463 of the BMT 46 in the present embodiment, the CPU 4 of the host 3 does not have to manage the bad blocks 45 and does not have to monitor unreliable physical blocks and defects of the flash memory 16. If a physical block is determined to be unreliable by the controller 14 of the storage device 2, the controller 14 prevent data from being written into the physical block by deleting an entry of the corresponding block address from one of the input block table 464, the active block table 462, and the free block table 461 that includes the entry and by adding the entry to the bad block table 463. For example, when a program error, an erase error, or an uncorrectable ECC error happens during access to a physical block, the controller 14 determines to remap the physical block as a bad block 45. In the present embodiment, a physical address in which data are to be written may be determined either by the host 2 or determined by the controller 14. When the physical address is determined by the controller 14, the host 3 does not need to perform such bad block management.

In addition, because an erase count of each physical block is managed by the controller 14 of the storage device 2 using the BMT 46, the controller 14 may carry out dynamic wear leveling when writing data into the flash memory 16. For example, in the present embodiment, when the controller 14 remaps a free block 44 in the free block pool 440 as an input block 42, the controller 14 selects a free block 44 that has the least erase count. If the free block 44 is located in a channel or a bank that is in a busy state, the controller 14 may select another free block 44 that has the second least erase count and is in an idle state from the free block pool 440.

When the controller 14 processes a write operation with respect to the input block 42, the controller 14 specifies the physical page address (PPA) by referring to the input block table 464, writes data into the physical page address of the input block 42, and increments the PPA in the input block table 464 ((New) PPA=(old) PPA+written data size). When the (new) PPA exceeds maximum page address of the input block 42, the controller 14 remaps the input block 42 as an active block 43 in the active block pool 430.

[Write Operation]

Figure 11A:
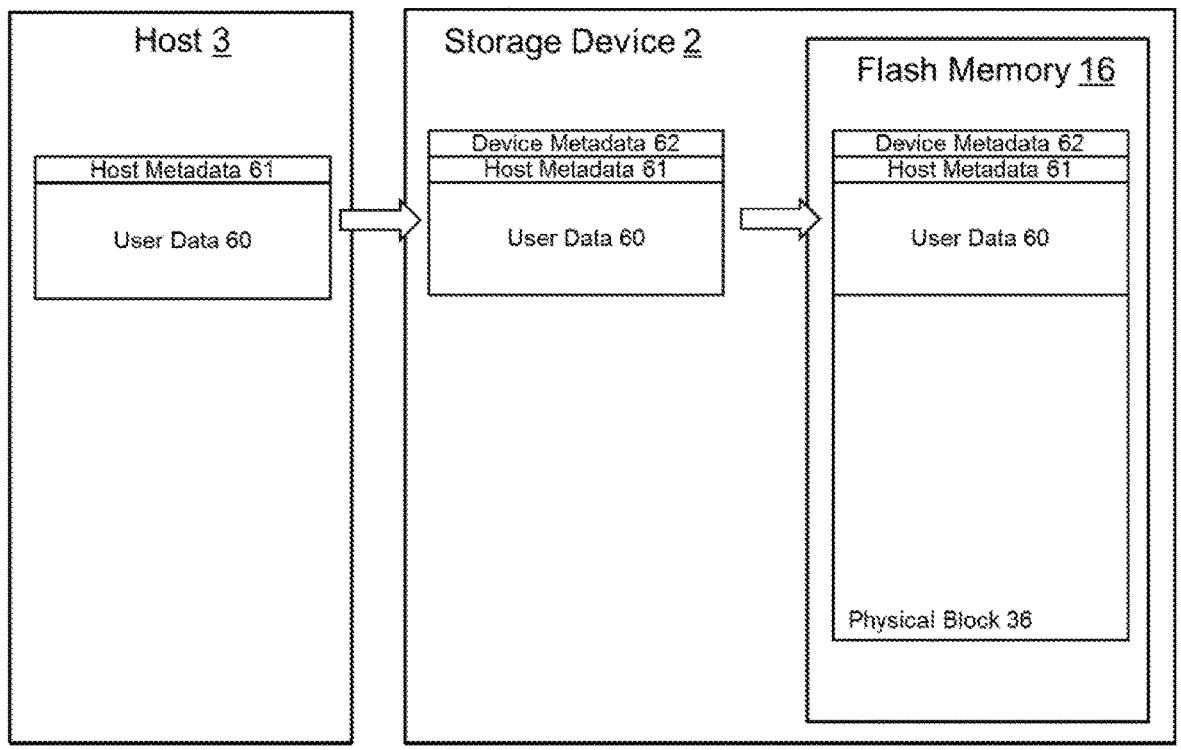
FIGS. 11A and 11B schematically illustrate content of data written in physical blocks of the flash memory 16 during a write operation according to the present embodiment.
Figure 11B:
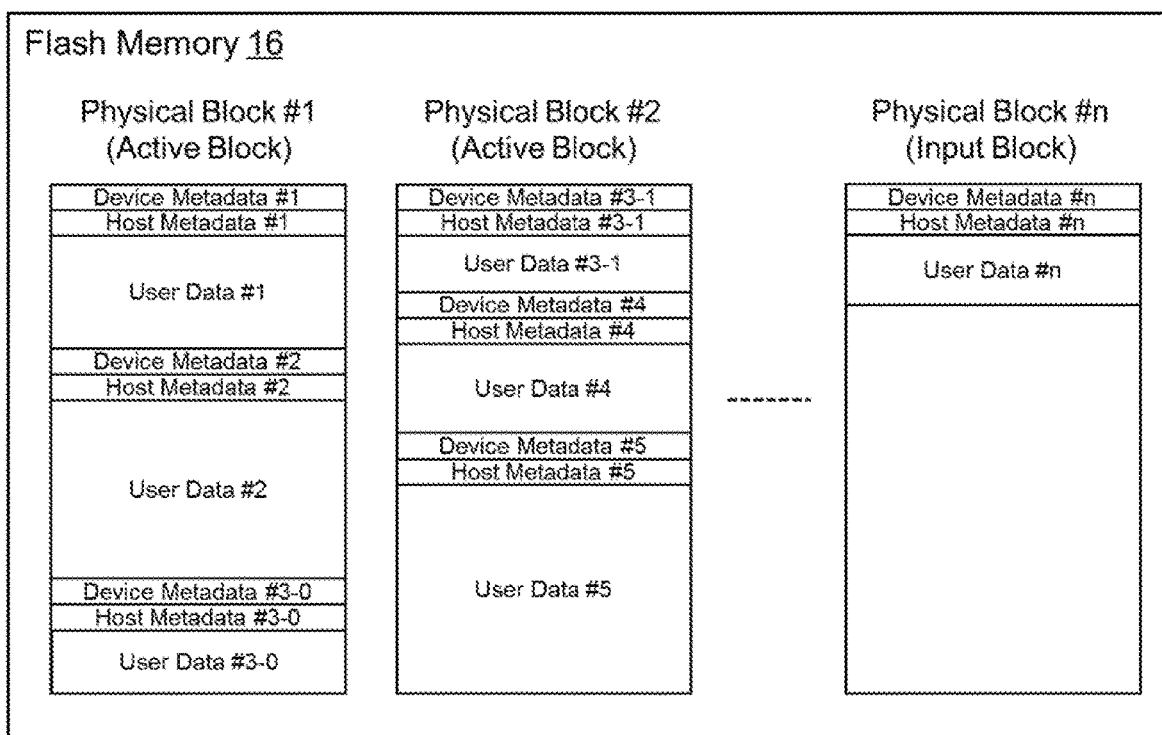

FIGS. 11A and 11B schematically illustrate content of data written in physical blocks of the flash memory 16 during a write operation according to the present embodiment. In the present embodiment, the host 3 attaches host metadata 61 to user data 60 for writing in the flash memory 16 of the storage device 2 as shown in FIG. 11A. The user data 60 is, for example, data requested to be written by the application software 13 executed in the host 3 and stored in the write buffer 54 before the user data 60 are transmitted to the storage device 2. The host metadata 61 are used to reconstruct the LUT 8 in the memory 5 when the LUT 8 is lost for some reason, such as unexpected power shut down of the host 3. Specifically, the host metadata 61 contain a data size thereof, a data size of the user data 60 to which the host metadata 61 is attached, the File ID (Object ID or logical address) of the user data 60, CRC (cyclic redundancy check) code for the user data 60, a unique command identifier (UCID) identifying a write command 91 that triggers this write operation, and a time stamp when the write command 91 was issued. Along with the write command 91 or after the write command 91 is transmitted from the host 3 to the storage device 2 through the interface 10, the user data 60 stored in the write buffer 54 and the host metadata 61 are transmitted to the storage device 2.

In the storage device 2, the controller 14 of the storage device 2 further attaches device metadata 62, which is metadata of the pair of the user data 60 and the host metadata 61, to the user data 60 for writing in the flash memory 16. The device metadata 62 are used to locate positions of the host metadata 61 corresponding thereto and other device metadata that are written in the same block or a different block during the following write operations. Specifically, the device metadata 62 contain a data side thereof, a data size of the host metadata 61 corresponding thereto, and a data size of the user data 60 corresponding thereto.

When the size of the user data 60 is too large to fit in one physical block, or a remaining space of a physical block (input block) is smaller than the size of the user data 60, the user data 60 are split into a plurality of pieces, and the host metadata 61 and the device metadata 62 are attached to each piece of the user data 60. In this case, each device metadata contains the size of the corresponding piece of the user data, and also an offset value for the identifier of each piece. For example, the offset value is 0 when the device metadata 62 is attached to a first portion of the user data 60, 1 when the device metadata 62 is attached to a second portion of the user data 60, and incremented by 1 for each of the following portions.

FIG. 11B illustrates data stored in a plurality of physical blocks (physical blocks 1 and 2) of the flash memory 16. As illustrated in FIG. 11B, each group of the device metadata, the host metadata, and the user data is written in the physical blocks in this order, so that a starting portion (first page) of each physical block stores the device metadata. More specifically, device metadata #1, host metadata #1, and user data #1 of a first group (#1) are written in a head portion of the physical block 1, and device metadata #2, host metadata #2, and user data #2 of a second group (#2) are stored in the following space of the physical block 2. As there is no sufficient space for the third group (#3), user data #3 is split into user data #3-0 and user data #3-1 and written in the physical blocks 1 and 2, respectively. Also, device metadata #3-0 containing the offset value of 0 and host metadata #3-0 are written in front of the user data #3-0, and device metadata #3-1 containing the offset value of 1 and host metadata #3-1 (may be same as host metadata #3-0) are written in front of the user data #3-1. In a similar manner, user data #4, #5, . . . # n, host metadata #4, #5, . . . # n, and device metadata #4, #5, . . . # n are written in the physical blocks of the flash memory 16.

Figure 12:
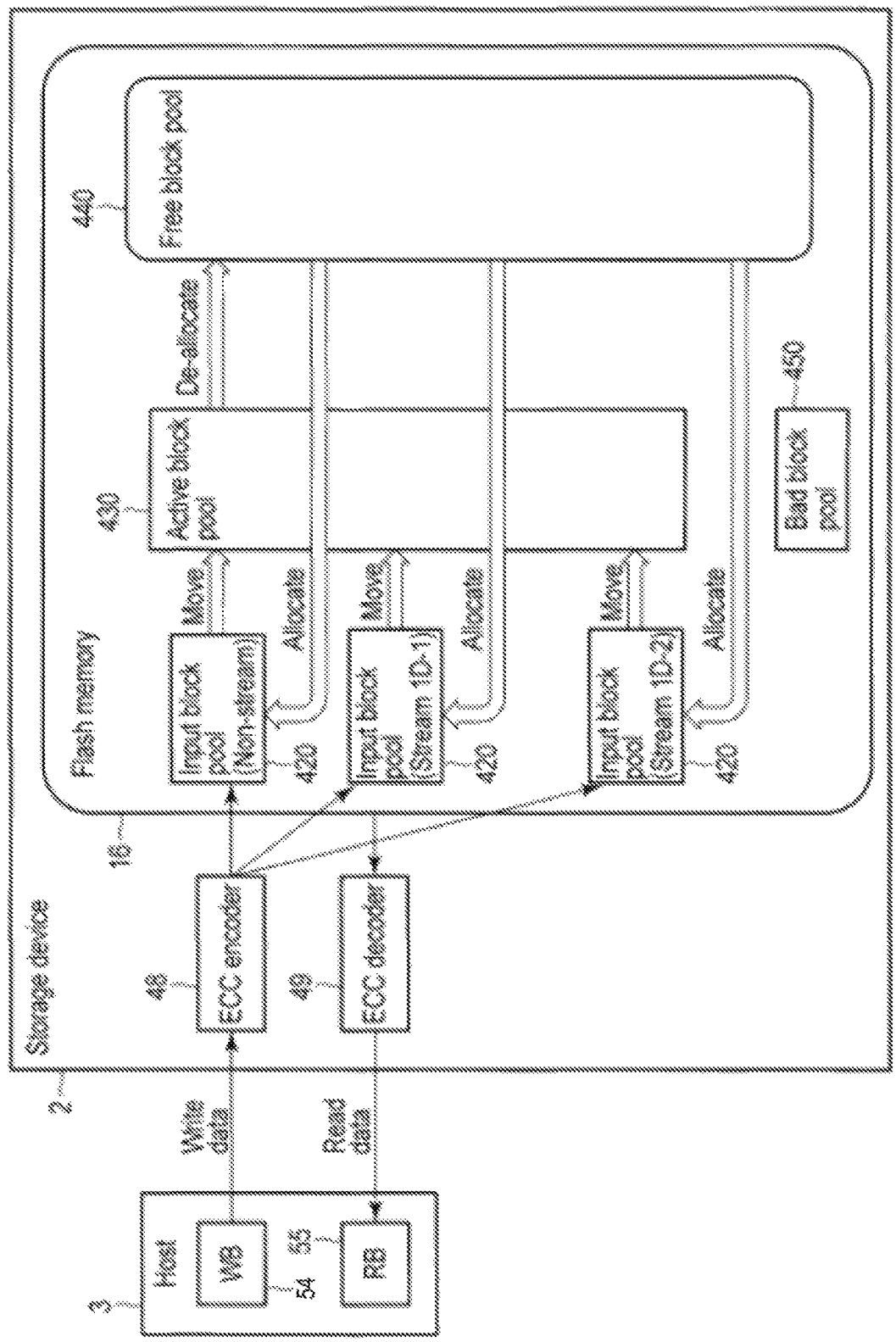
FIG. 12 illustrates an architecture overview of data flow and a block mapping transition in accordance with a write operation carried out in the storage device according to the embodiment.

FIG. 12 schematically illustrates an example of a write operation performed in the storage device 2 according to the present embodiment in terms of block management based on the block mapping table 46. During the write operation, the controller 14 writes user data stored in the write buffer 54, and host metadata and device metadata for the user data, into the flash memory 16. Each of the input block pool 420, the active block pool 430, the free block pool 440, and the bad block pool 450 in FIG. 12 includes one or more physical blocks.

The controller 14 receives the user data from the write buffer 54 via the interface 10 and generates an ECC code from the user data using an ECC encoder 48 of the controller 14. Also, the controller 14 decodes read data, which include the user data and the ECC code, using an ECC decoder 49 in the controller 14 during a read operation described below.

When the controller 14 writes the user data from the write buffer 54 and the host metadata and device metadata thereof (collectively write data) into the flash memory 16, the controller 14 determines physical addresses of pages in the input block 42 of the input block pool 420 into which the write data are to be written by referring to the BMT 46. If there is no available input block 42 in the flash memory 16, the controller 14 allocates a new input block 42 by remapping a free block 44 in the free block pool 440.

In addition, if no physical page in the input block 42 is available for data writing without erasing data therein, i.e., becomes full of written data, the controller 14 remaps the block as an active block 43 in the active block pool 430. The controller 14 may also remap (de-allocate) an active block 43 in the active block pool 430 as a free block 44 in the free block pool 440.

A plurality of input blocks 42 is prepared in a plurality of input blocks 420, each of which is dedicated for data writing with respect to a corresponding stream ID, and user data associated with a stream ID is written into an input block 42 associated with the stream ID. The write command 91 from the host 3 includes the stream ID in this example. When the host 3 operates to post a write command specifying a stream ID to the submission queue 50, the controller 14 receives the user data from the write buffer 54 and writes the write data (including the host and device metadata) into the input block 42 associated with the stream ID. If the host 3 operates to post a write command which does not specify a stream ID to the submission queue 50, the controller 14 receives the user data from the write buffer 54 and writes the write data (including the host and device metadata) into an input block 42 associated with no stream ID. By storing user data into different input blocks 42 in accordance with the stream ID, the type of user data (or lifetime of data) stored in each input block 42 can be made more uniform, and as a result, entire data in a physical block may be deleted without having to partially transfer the data to another physical block when garbage collection operation is performed, i.e., garbage collection operation becomes more efficient.

Figure 13:
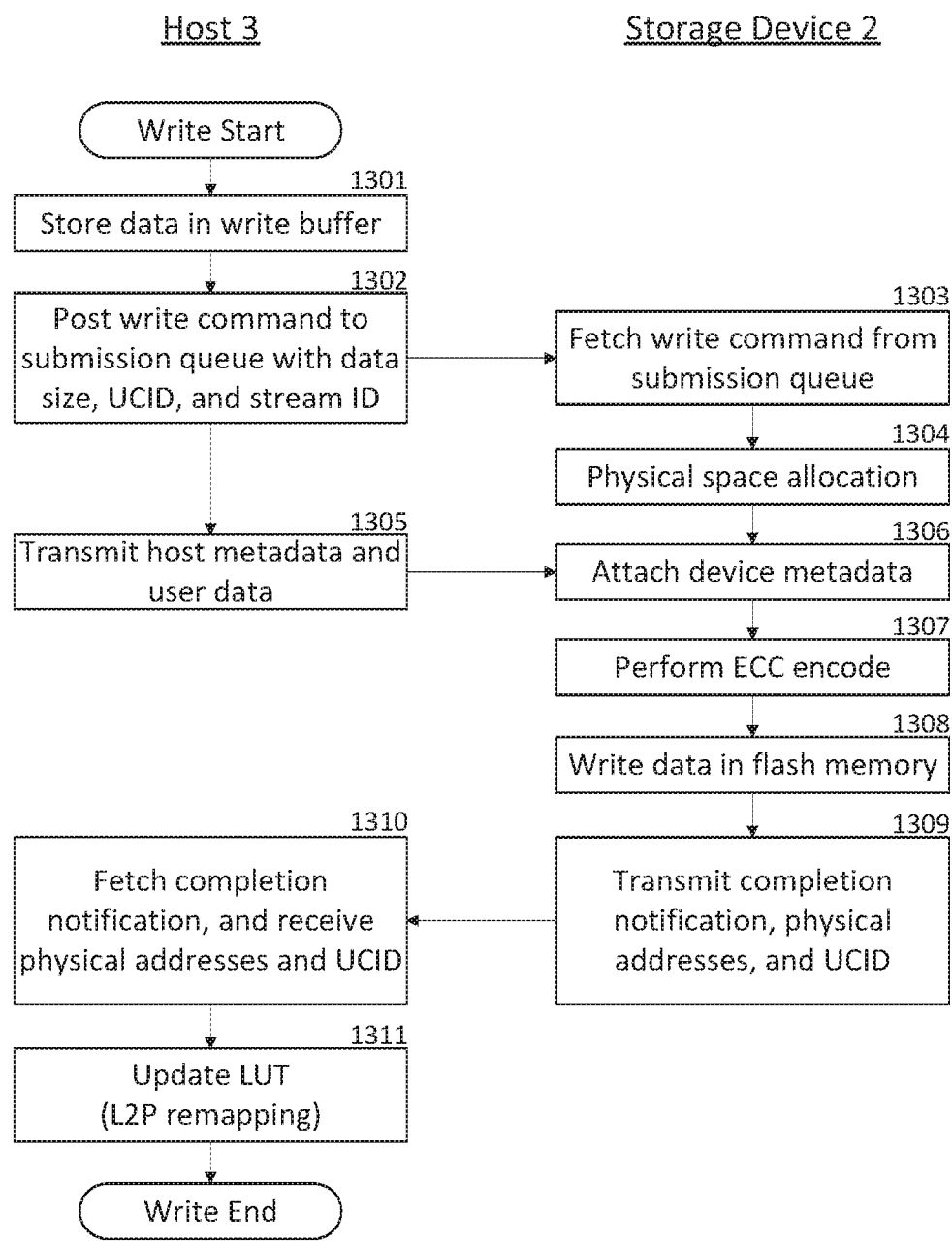
FIG. 13 illustrates a flow of a write operation carried out according to the embodiment.

FIG. 13 illustrates a flow chart of a write operation. In the write operation of this example, the storage device 2 determines the physical address of the memory cell array 22 into which user data are to be written and the host 3 makes no designation of the physical address or the logical address. When the write operation starts, in step 1301, the host 3 writes user data into the write buffer (WB) 54 of the host 3. Also, the host 3 updates the LUT 8 stored in the memory 5 of the host 3, so that mapping between File ID (Object ID, or logical address) of the user data and an address of the WB 54 are stored therein. Then, in step 1302, the host 3 posts a write command, which includes size information of the user data and the host metadata but includes no address information to the submission queue 50 of the host 3. The write command also includes a Unique Command Identifier (UCID) and a stream ID.

In step 1303, the controller 14 of the storage device 2 fetches the write command from the submission queue 50. Then, in step 1304, the controller 14 determines a physical location (physical address 56) of the flash memory 16 in which the user data are to be written, referring to the BMT 46. Specifically, the controller 14 determines a first non-written page of an input block 42 corresponding to the stream ID as the physical location.

Upon the storage device 2 fetching the write command, in step 1305, the host 3 transmits the user data stored in the WB 54 along with the host metadata attached thereto, to the storage device 2 through the interface 10. Here, the order of steps 1304 and 1305 are not limited to this order, and these two steps may be carried out in the opposite order or concurrently. In step 1306, the controller 14 of the storage device 2 attaches device metadata to the user data (and the host metadata) received from the host 3.

In step 1307, the ECC encoder 48 (See FIG. 10) of the controller 14 generates an ECC code from the user data. In step 1308, the controller 14 writes the group of the user data, the host metadata, and the device metadata (i.e., the write data) and the ECC code in the determined physical location of the flash memory 16 (input block 42).

Upon writing of the write data in the input block 42, in step 1309, the controller 14 transmits a write completion notification, which includes the physical address 56 into which the write data were written and the UCID included in the write command, to the host 3. Then, the write completion notification is posted on the completion queue 51 of the host 3. In step 1310, the host 3 fetches the write completion notification from the completion queue 51. In step 1311, the host 3 updates the LUT 8 stored in the memory 5 of the host 3, so that mapping between File ID (Object ID or logical address) of the user data and the physical address 56 of the input block 42 are stored therein. Through these processes, the write operation ends.

In another embodiment, the write operation is carried out in a manner in which the host 3, instead of the controller 14 of the storage device 2, determines the physical address of the memory cell array 22 into which the user data are to be written. In this case, in step 1302, the host 3 posts the determined physical address to the submission queue 50 along with the write command, the size information, the UCID, and the stream ID. Also, since the controller 14 does not determine the physical address, step 1304 can be omitted. Furthermore, as the host 3 already recognizes the physical address in which the user data are written, the write completion notification sent from the storage device 2 does not need to contain the physical address.

[Scan Operation]

Figure 14:
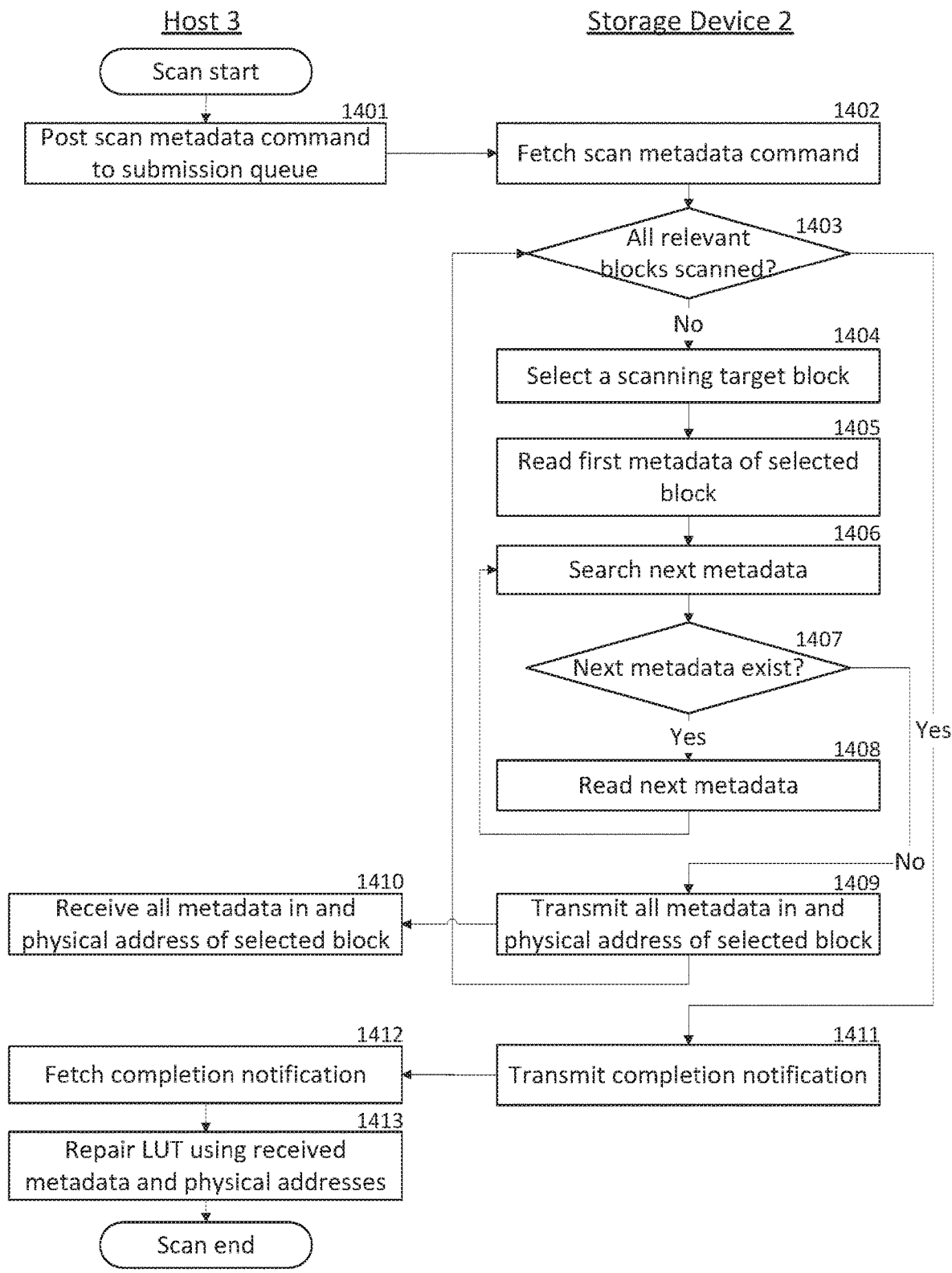
FIG. 14 illustrates a flow of a scan operation carried out according to the embodiment.

FIG. 14 illustrates a flow chart of a scan operation, during which all active blocks and all input blocks are scanned and all device metadata and host metadata are read from the scanned blocks, and the LUT 8 is reconstructed from mapping data included in the read host metadata. Typically, the scan operation is initiated by the host 3 when the LUT 8 stored in the memory 5 is lost for some reason, such as sudden power shutdown of the host 3. When the scan operation starts, in step 1401, the host 3 posts a scan command (scan metadata command) 92 to the submission queue 50.

In step 1402, the controller 14 of the storage device 2 fetches the scan command from the submission queue 50 and starts the scanning operation on the side of the storage device 2. In step 1403, the controller 14 determines whether or not the scanning operation has been carried out on all blocks storing device metadata and host metadata tied to valid user data, i.e., all active blocks and all input blocks. If the determination is positive (Yes in step 1403), the process proceeds to step 1411. If the determination is negative (No in step 1403), the process proceeds to step 1404.

In step 1404, the controller 14 selects a scanning target block from the active block pool 430 or the input block pool 420. In step 1405, the controller 14 reads the first metadata (device metadata and host metadata) starting from the first page of the scanning target block and temporarily stores the read metadata in a memory region of the RAM 15. Here, the controller 14 can determine how long the first device metadata extends (i.e., the last page of the device metadata) by reading the size thereof, and locate the starting page of the following host metadata. Further, the controller 14 can determine how long the first host metadata extends (i.e., the last page of the host metadata) by reading the size thereof. Then, in step 1406, the controller 14 searches (a starting page of) the next metadata (device metadata) by reading the size of the first user data that are contained in the first device metadata and the first host metadata. In step 1407, the controller 14 determines whether or not the next metadata exists in the scanning target block. Here, the controller 14 locates (a starting page of) the next metadata by reading the size of the user data from the read device metadata (or the read host metadata). That is, the controller 14 skips the user data following the host metadata without reading.

If the determination is positive (Yes in step 1407), the controller 14 reads the next metadata (device metadata and host metadata) and stores the read metadata in the RAM 15 in a similar manner as step 1406. Then, the process returns to step 1406 to find another metadata in the scanning target block. If the determination is negative (No in step 1407), in step 1409, the controller 14 transmits all metadata stored in the RAM 15 and the physical address of the scanning target block to the host 3 through the interface 10. Then, the process returns to step 1403. In step 1410, the host 3 receives all metadata of the scanning target block and the physical address, and temporarily stores the received data in a memory region of the memory 5, e.g., the read buffer 55.

In step 1411, i.e., when all active blocks and input blocks are determined to be scanned in step 1403, the controller 14 of the storage device 2 transmits a scan completion notification to the host 3, so that the scan completion notification is posted on the completion queue 50. In step 1412, the host 3 fetches the scan completion notification from the completion queue 51. In step 1413, the host 3 carries out repair of the LUT 8 using mapping related data (logical addresses, and the sizes of user data, host metadata, and device metadata) and the physical addresses. Through these processes, the scan operation ends.

As the foregoing illustrates, according to the above embodiments, during the write operation, the host 3 transmits host metadata, which include the size of the host metadata, the size of the user data, File ID, and so on, in addition to the user data to the storage device 2. Then, the controller 14 of the storage device 2 attaches device metadata to the user data, and writes the device metadata, the host metadata, and the user data in a physical block (input block)

of the flash memory 16 in this order. In each physical block (active block and input block) of the flash memory 16, device metadata are written in the first page thereof. During the scan operation, all device metadata and all host metadata are read from all active blocks and all input blocks and the LUT 8 is reconstructed based on the read metadata. Therefore, according to the above embodiments, even if the LUT 8 becomes unavailable or lost for some reason, e.g., sudden power shut down of the host 3, the LUT 8 can be reconstructed and the host 3 can map data stored in the flash memory 16 using the LUT 8. Accordingly, more reliable data storage system can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile memory including a plurality of physical blocks;
   a communication interface connectable to a host; and
   a controller configured to:
      receive through the communication interface from the host, a write command and host data associated with the write command, the host data including user data to be stored and first metadata relating to the user data, the first metadata including at least a size thereof and a size of the user data;
      in response to receiving the host data, generate second metadata relating to the received host data, the second metadata being different from the first metadata, the second metadata including metadata relating thereto, metadata relating to the user data, and metadata relating to the first metadata; and
      write, in a physical block of the nonvolatile memory, the generated second metadata, the received first metadata, and the received user data continuously in this order.

2. The storage device according to claim 1, wherein
   the first metadata also include a logical address or identifier of the user data, and
   the second metadata include at least a size thereof, a size of the first metadata, and the size of the user data.

3. The storage device according to claim 2, wherein
   when the user data from a single write command are split into multiple portions and written in multiple physical blocks, the controller writes the second metadata and the first metadata and a portion of the user data continuously in this order, in each of the multiple physical blocks.

4. The storage device according to claim 3, wherein
   the second metadata written in each of the multiple physical blocks further include a different offset value indicative of an arranging sequence of the split portions of the user data.

5. The storage device according to claim 1, wherein
   the controller is further configured to:
      determine a physical location of the nonvolatile memory in which the second metadata, the first metadata, and the user data are to be written, when the write command is received through the communication interface; and
      control the communication interface to return a notification along with the determined physical location upon completion of writing of the host data, the first metadata, and the user data.

6. The storage device according to claim 1, wherein
   the controller is further configured to selectively read second metadata relating to host data and first metadata relating to user data stored in all physical blocks that store valid user data without reading user data and control the communication interface to transmit the read metadata, when a scan command is received through the communication interface.

7. The storage device according to claim 6, wherein
   the controller controls the communication interface to transmit the read metadata each time reading of a physical block completes.

8. The storage device according to claim 6, wherein
   the controller is further configured to control the communication interface to return a notification upon completion of reading metadata from said all physical blocks that store valid user data.

9. A storage system comprising:
   a storage device including a nonvolatile memory including a plurality of physical blocks, a communication interface, and a controller; and
   a host connected to the communication interface of the storage device, and including a processor and a volatile memory in which mapping between a logical address or identifier of user data and a physical location of the nonvolatile memory is stored, wherein
   the controller is configured to:
      receive through the communication interface from the host, a write command and host data associated with the write command, the host data including user data to be stored and first metadata relating to the user data, the first metadata including at least a size thereof and a size of the user data;
      in response to receiving the host data, generate second metadata relating to the received host data, the second metadata being different from the first metadata, the second metadata including metadata relating thereto, metadata relating to the user data, and metadata relating to the first metadata; and
      write, in a physical block of the nonvolatile memory, the generated second metadata, the received first metadata, and the received user data continuously in this order.

10. The storage system according to claim 9, wherein
    the first metadata also include a logical address or identifier of the user data, and
    the second metadata include at least a size thereof, a size of the first metadata, and the size of the user data.

11. The storage system according to claim 10, wherein
    when the user data from a single write command are split into multiple portions and written in multiple physical blocks, the controller writes the second metadata and the first metadata and a portion of the user data continuously in this order, in each of the multiple physical blocks.

12. The storage system according to claim 11, wherein
    the second metadata written in each of the multiple physical blocks further include a different offset value indicative of an arranging sequence of the split portions of the user data.

13. The storage system according to claim 9, wherein the controller is configured to determine a physical location of the nonvolatile memory in which the second metadata, the first metadata, and the user data are to be written, and transmit the physical location along with the write command.

14. The storage system according to claim 9, wherein the controller is further configured to selectively read second metadata relating to host data and first metadata relating to user data stored in all physical blocks that store valid user data without reading user data and control the communication interface to transmit the read metadata, when a scan command is received through the communication interface from the host.

15. The storage system according to claim 14, wherein the controller controls the communication interface to transmit the read metadata each time reading of a physical block completes.

16. The storage system according to claim 14, wherein the processor is configured to issue the scan command when the mapping is lost from the volatile memory or when the mapping in the volatile memory is not accessible.

17. The storage system according to claim 16, wherein the processor is configured to reconstruct the mapping based on the metadata received through the communication interface.

18. A computing device connectable to a nonvolatile storage device, comprising:
a volatile memory; and
a processor configured to:
  transmit host data, which include user data to be stored and first metadata relating to the user data, in association with a write command issued thereby, the first metadata including at least a size thereof and a size of the user data;
  store, in the volatile memory, mapping that has been constructed, the mapping being between a logical address or identifier of the user data and a physical location of the nonvolatile storage device in which the user data are written;
  issue a scan command to the nonvolatile storage device when the mapping is lost from the volatile memory or when the mapping in the volatile memory is not accessible; and
  reconstruct the mapping that has been lost based on second metadata relating to the host data and the first metadata, the second metadata being different from the first metadata, the second metadata including metadata relating thereto, metadata relating to the user data, and metadata relating to the first metadata, the second metadata being generated by the nonvolatile storage device and returned from the nonvolatile storage device in response to the scan command.

19. The computing device according to claim 18, wherein the first metadata also include a logical address or identifier of the user data, and
the second metadata include at least a size thereof, a size of the first metadata, and the size of the user data.

20. The computing device according to claim 18, wherein the processor is configured to:
  issue the write command that further includes an identifier of the write command; and
  receive from the nonvolatile storage device in response to the write command, the identifier and a physical location of the nonvolatile storage device in which the first metadata, the second metadata, and the user data have been written.

* * * * *